R. MAROT.
PROCESS OF PRESERVING FISH.
APPLICATION FILED JAN. 24, 1906.
991,337.
Patented May 2, 1911.
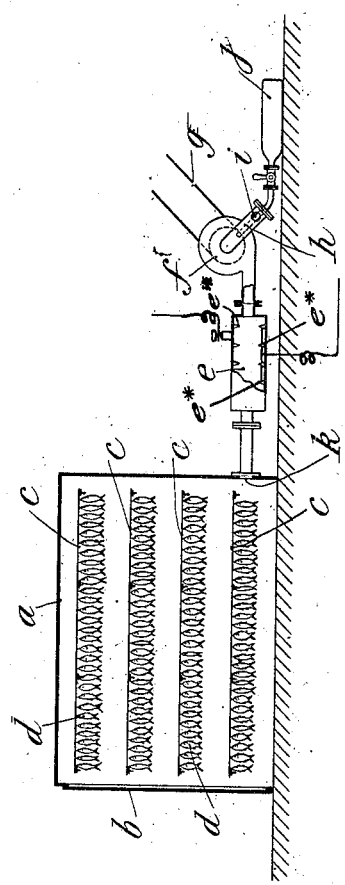

UNITED STATES PATENT OFFICE.

RENÉ MAROT, OF PARIS, FRANCE.

PROCESS OF PRESERVING FISH.

991,337.      Specification of Letters Patent.      Patented May 2, 1911.

Application filed January 24, 1906. Serial No. 297,637.

*To all whom it may concern:*

Be it known that I, RENÉ MAROT, a citizen of the Republic of France, and resident of Paris, in the said Republic, engineer, have invented a new and useful Improved Process of Preserving Fish, of which the following is a specification.

It is a question of prime importance in the fishing industry, particularly for cod fishing, which involves long sojourns in places far from port and the use of a large quantity of bait, that it should be possible to carry on board an amount of bait which shall not only escape putrefaction but shall have at the time of use all the appearance of fresh fish, so that it may be well fitted for its purpose.

The present invention relates to a process whereby these ends may be attained.

In the accompanying drawing an apparatus is illustrated diagrammatically which may be employed to carry out my invention.

*a* is a closed room or chamber furnished with a door *b*. In this chamber the fish *d* may be suspended from wires *c*. The gaseous mixture may be introduced into the chamber or room *a* from a chamber *e* through an opening *k*. The chamber *e* is preferably of glass and is furnished with electrodes *e*\*. A fan or blower *f* is connected to the chamber *e*, which fan or blower is driven by a belt *g*. A pipe *h* leads into the center of the fan or blower *f*, in which pipe are located one or more air inlets *i*. The sulfurous anhydrid is furnished from a metallic bottle *j* where it may be retained at high pressure and in a liquid state. The sulfurous anhydrid is fed in proper quantities to be mixed with the air in the pipe *h*.

The invention consists in first exposing for a certain time the fish which is to be preserved to the action of a gaseous mixture obtained by causing air mixed with sulfurous anhydrid to traverse a space wherein the mixture is subjected to the action of one ozonizer the silent electric discharge or electric sparks produced by an electric current of high voltage, or the silent electric discharge and electric sparks concurrently. The fish thus treated are then dried in air.

Care should be taken that the gaseous mixture has access to all parts of the surface of the fish, which should therefore be suspended, without touching each other, in the chamber through which, when it has been closed, the mixture is passed.

Any known method of producing a mixture of sulfurous anhydrid and air, and any known apparatus for subjecting a gas to the action of the silent electric discharge or of electric sparks, may be used.

In practice I preferably use a gas composed of sulfurous anhydrid and atmospheric air of about ten per cent. strength, or say about 274 grams of sulfurous anhydrid to a cubic meter of atmospheric air, which gas is subjected to the action of an ozonizer and the fish to be preserved may be treated with the gaseous mixture thus obtained for about twenty four hours.

What I claim as my invention and desire to secure by Letters Patent, is:—

A process for preserving fish, especially for use as bait, consisting in submitting it first, in a closed room, to the action of a gaseous mixture obtained by causing air mixed with sulfurous anhydrid to traverse a space wherein the mixture is subjected to the action of an ozonizer, and then drying the fish in the air.

In testimony, that I claim the foregoing as my invention, I have signed my name in presence of two witnesses, this 12th day of January, 1906.

RENÉ MAROT.

Witnesses:
    HANSON C. COXE,
    HENRY THIESSE.